Nov 24, 1970     F. KLUMPP, JR     3,543,217
MULTIPURPOSE ELECTRIC RECEPTACLE FITTING AND RECEPTACLE
Filed June 25, 1968     4 Sheets-Sheet 1

INVENTOR.
FERDINAND KLUMPP, JR.
BY Auslander + Thomas
ATTORNEYS

Nov 24, 1970    F. KLUMPP, JR    3,543,217
MULTIPURPOSE ELECTRIC RECEPTACLE FITTING AND RECEPTACLE
Filed June 25, 1968    4 Sheets-Sheet 2
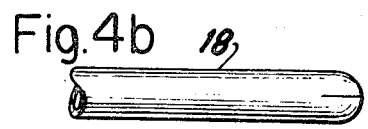
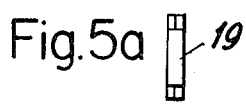
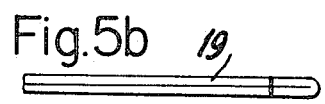
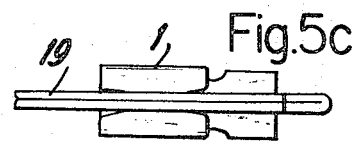
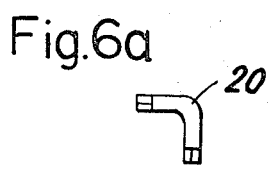
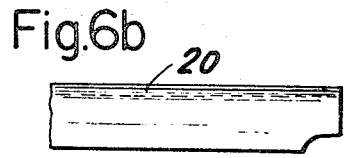
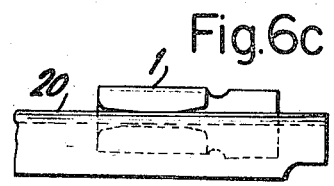
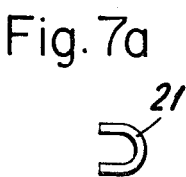
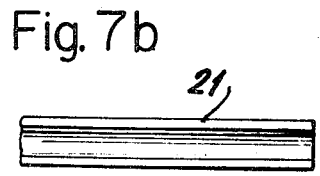
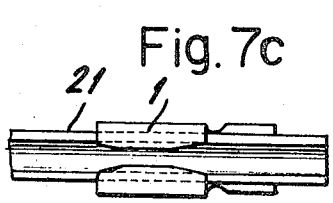
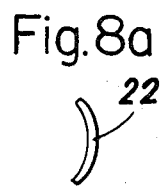
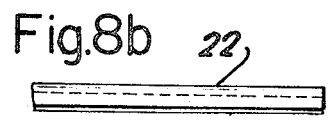
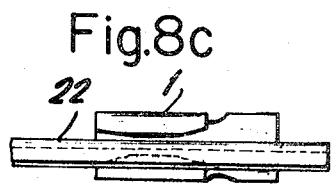
INVENTOR.
FERDINAND KLUMPP, JR.
BY
ATTORNEYS Nov 24, 1970  F. KLUMPP, JR  3,543,217
MULTIPURPOSE ELECTRIC RECEPTACLE FITTING AND RECEPTACLE
Filed June 25, 1968  4 Sheets-Sheet 3

INVENTOR.
FERDINAND KLUMPP, JR.
BY Ausländer, Thomas
ATTORNEYS

Nov 24, 1970  F. KLUMPP, JR  3,543,217
MULTIPURPOSE ELECTRIC RECEPTACLE FITTING AND RECEPTACLE
Filed June 25, 1968  4 Sheets-Sheet 4

INVENTOR.
FERDINAND KLUMPP, JR.
BY Auslander & Thomas

ATTORNEYS

United States Patent Office 3,543,217
Patented Nov. 24, 1970

3,543,217
MULTIPURPOSE ELECTRIC RECEPTACLE FITTING AND RECEPTACLE
Ferdinand Klumpp, Jr., Mountainside, N.J., assignor to Heyman Manufacturing Company, Kenilworth, N.J., a corporation of New Jersey
Filed June 25, 1968, Ser. No. 739,695
Int. Cl. H01r 13/12
U.S. Cl. 339—32                                                                        15 Claims

ABSTRACT OF THE DISCLOSURE

The present invention relates to a new electric contact receptacle female fitting uniquely shaped so that the same fitting may be used to receive almost all the variant shapes of standard electric plug blades and pins, thus eliminating the need for different shaped female fitting, for different shaped blades such as flat blades, right angle blades and curved blades with the same fitting able to receive round pins and D pins.

---

The present invention relates to a multipurpose female electrical contact fitting.

In the past, electric contact receptacles have been provided with a multitude of different contacts for making contact with conductor blades and pins in electrical plugs.

There are a limitless number of special application electrical connectors including plugs, receptacles and contact fittings in the electronic field. There are many contacts adapted for more than one use and there are receptacle contact fittings which may be adapted to a selection of contacts.

The situation is quite different in the area of plugs with blades and pins and receptacles for making contact in the use of usual home and industrial electrical connectors adapted to make contact, usually up to about 60 amperes and 250 volts. This area is substantially limited by standards set by Underwriters' Laboratories, Inc. so that there can be uniformity of receptability of receptacles to different blades and pins in plugs, as far as fire and safety standards for electrical contacts are concerned.

Underwriter's Laboratories, Inc. sets standards of size, dimension and capacity which include plug and receptacle dimensions, plug contact shapes and receptacle opening widths, shapes, dimensions for various contact blades and plug and receptacle layouts. The incidence of shapes specified by Underwriters' Laboratories for contacts is finite, although there are an infinite variety of ways of preparing the contacts to meet the Underwriters' Laboratories, Inc. standards.

For instance, lengths, widths and thickness dimensions of contact blades and pins are specified for various voltage and amperage capacities. Within this area only a limited number of plug contact shapes are contemplated. There is also a limited number of contact thicknesses imposed upon the shapes. Thus, there are a given number of shapes of contacts though there may be duplication of such shapes of different metal stock thicknesses to accommodate the requirements of contacts for higher or lower amperages and voltages.

Many techniques have been used in the construction of contact blades for plugs with minor variants allowable, yet all blades must fit into corresponding receptacles openings. The openings are dimensional to be sufficiently larger than the blades and pins to accept them. Contact with the blades or pins is then made by contacts within the receptacle. Blades or pins themselves may usually be solid, folded or folded and bowed, all within the set specification.

In the past, the contacts provided within the receptacles have been adapted to the particular receptacle and the blade or pin which is designed for each receptacle opening. There have been many shapes and sizes of such fittings. This lack of uniformity has in the past required inventorying many shapes and sizes of receptacle fittings and in particular separate fittings were required in a multi-opening receptacle adapted for both round or U-shaped ground pins.

A D shaped female receptacle fitting is usually provided for in the receptacle to receive both the round or U shaped ground pin.

The D shaped female fitting was found to be more flexible where its wire attaching portion contact or crimp was at its outer periphery, so that a pin could go through the D fitting. The contact then does not have to be as long as the particular pin it was designed to receive, and the wire contact to the fitting can be at a point on the outer periphery of the fitting.

Even with this improvement of the D shaped female fitting, receptacles adapted to receive different shaped male contacts, there were required a plurality of different shaped female fittings in a receptacle in order to have a complete receptacle. Flat blades usually had one or two side contacts or a spring-like contact or male contacts had some form of contact plate.

According to the present invention, a multi-purpose female receptacle fitting is provided wherein a single shaped female fitting may receive almost any selection of standard male plug contact blades or pins.

The shape of the fitting provides the unusual advantage of the present invention, since one shape is adapted to receive most known standard shapes of plug contact blades and pins and only a few size variations are required to provide fittings for almost the entire spectrum pins and blades on the various combination of plugs.

Although such novel feature or features believed to be characteristic of the invention are pointed out in the claims, the invention and the manner in which it may be carried out may be further understood by reference to the description following and the accompanying drawings.

FIG. 3 is a side elevation of another embodiment of the multipurpose female fitting of FIGS. 2 and 2a.

FIG. 3a is a side elevation of another embodiment of the multipurpose female fitting of FIGS. 1 and 1a.

FIG. 4a is an end elevation of a round ground pin.

FIG. 4b is a side elevation of FIG. 4a.

FIG. 4c is a plan view of the pin of FIG. 4a held in the fitting of FIG. 1.

FIG. 5a is an end elevation of a flat blade.

FIG. 5b is a side elevation of FIG. 5a.

FIG. 5c is a plan view of the blade of FIG. 5a, b, held in the fitting of FIG. 1.

FIG. 6a is an end elevation of a right angle ground blade.

FIG. 6b is a side elevation of FIG. 6a.

FIG. 6c is a plan view of the blade of FIG. 6a held in the fitting of FIG. 1.

FIG. 7a is an end elevation of a U shaped ground pin.

FIG. 7b is a side elevation of FIG. 7a.

FIG. 7c is a plan view of the pin of FIG. 7a held in the fitting of FIG. 1.

FIG. 8a is an end elevation of a curved blade.

FIG. 8b is a side elevation of FIG. 8a.

FIG. 8c is a plan view of the blade of FIG. 8a held in the fitting of FIG. 1.

Referring now to the figures in greater detail, where like reference numbers denote like parts in the various figures.

Figure 1:
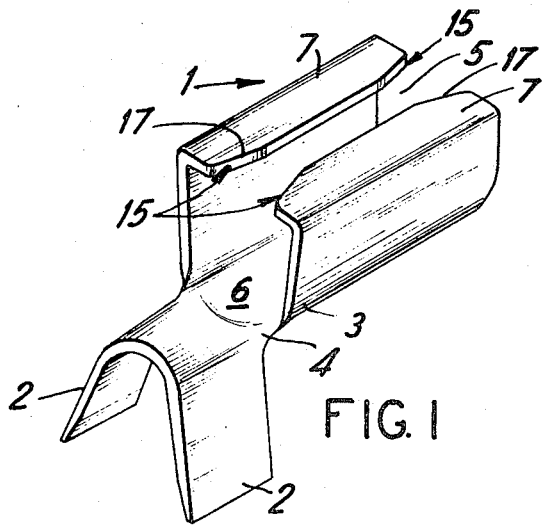
FIG. 1 is an isometric view of a multipurpose female fitting of the present invention.

As shown in FIG. 1 the female fitting 1 is D shaped, it has a D shaped cross-section, and is provided with crimp arms 2 extending back from the opening in the body 3. The crimp arms 2 as shown in FIG. 1 extend back and form a neck portion 4 extension of the body 3. The fitting 1 is provided with a longitudinal slot 5 which is in effect a discontinuance of the unitary wall construction of the present invention. The end of the walls are spaced apart approximately the thickness of a contact blade so that a contact blade's span may be engaged in the slot 5 in good electrical contact.

The body 3 of the female fitting 1 of FIG. 1 comprises an integral U shaped body portion 6 and flanges 7 forming a flat, closing the U portion 6 and defining the slot 5 which longitudinally traverses the fitting.

Figure 1A:
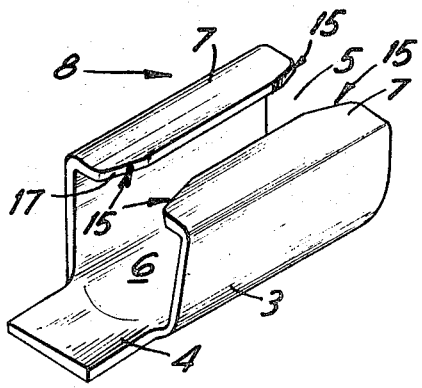
FIG. 1a is another embodiment of the multipurpose female fitting of FIG. 1.

As shown in FIG. 1a the female fitting 8 has the same D shape configuration as the female fitting 1, with the exception that the female fitting 8 has a neck portion 4, but is not provided with wire engageable crimp arms.

Figure 2:
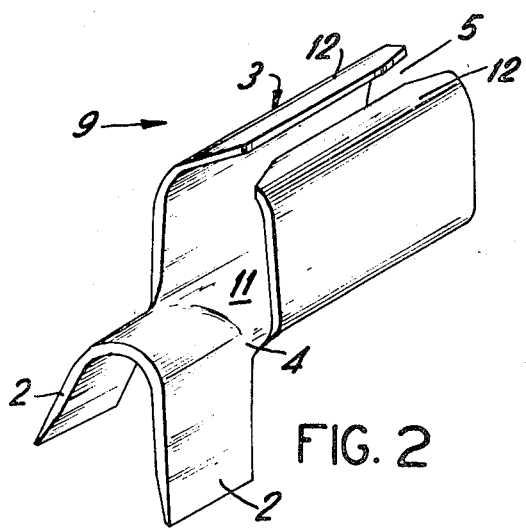
FIG. 2 is an isometric view of another multipurpose female fitting of the present invention.
Figure 2A:
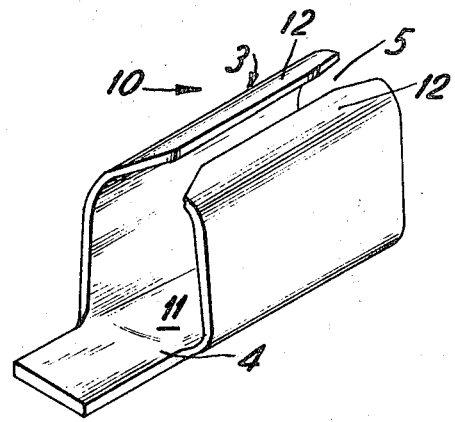
FIG. 2a is an isometric view of another multipurpose female fitting of FIG. 2.

The female fittings 9 and 10 as shown have a body portion 3 with a longitudinal slot 5 and a neck 4. The female fittings 9, 10 circumscribe a D shape, only the flat of the D is unbroken and the U is formed from two flanges 12 which are spaced apart to form the slot 5. As shown in FIG. 2, crimp arms 2 may be provided which are adapted to crimp wire away from the opening in the body 3 so that a blade may fit into the slot 5 or a pin fit through the center portion of the body 3.

It is preferable that the U shaped portions 6, 12 have an arc approximately the radius of a round pin or the radius of the curved portion of a U shaped pin such as shown in FIGS. 4a–e and 6a–e. The combination of the arc radius and slot span provides the wide adapability for almost any combination of female fitting 1 required by almost any receptable.

Figure 3:
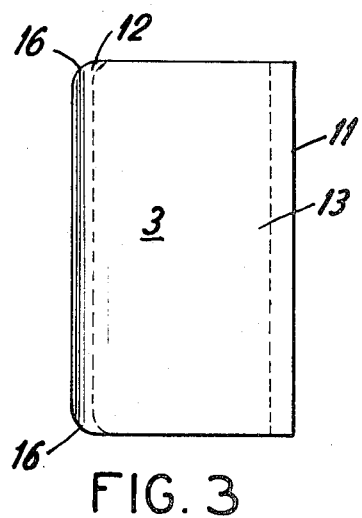
Figure 3A:
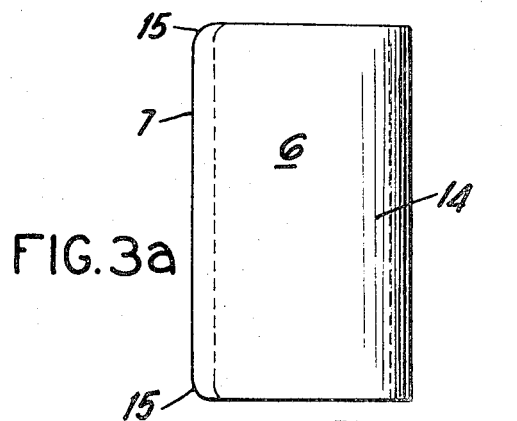
Figure 4D:
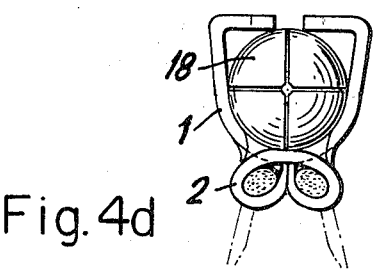
FIG. 4d is an end elevation of FIG. 4c.
Figure 4E:
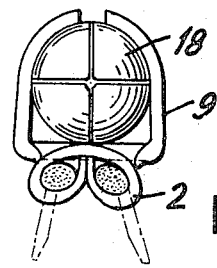
FIG. 4e is an end elevation of the pin of FIG. 4a, b in the fitting of FIG. 2.
Figure 5D:
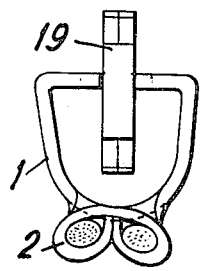
FIG. 5d is an end elevation of FIG. 5c.
Figure 5E:
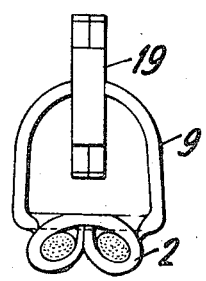
FIG. 5e is an end elevation of the blade of FIG. 5a, b in the fitting of FIG. 2.
Figure 6D:
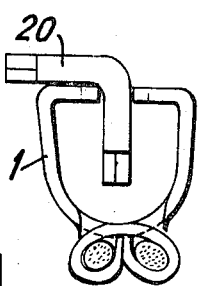
FIG. 6d is an end elevation of FIG. 6c.
Figure 6E:
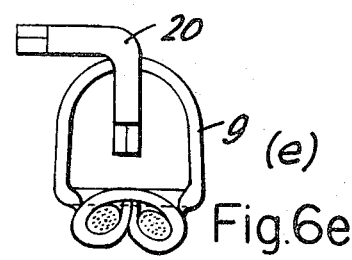
FIG. 6e is an end elevation of the blade of FIG. 6a, b in the fitting of FIG. 2.
Figure 7D:
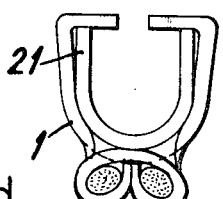
FIG. 7d is an end elevation of FIG. 7c.
Figure 7E:
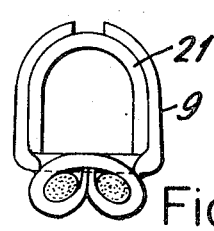
FIG. 7e is an end elevation of the pin of FIG. 7a, b in the fitting of FIG. 2.
Figure 8D:
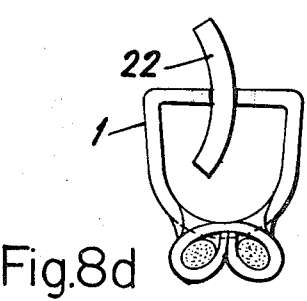
FIG. 8d is an end elevation of FIG. 8c.
Figure 8E:
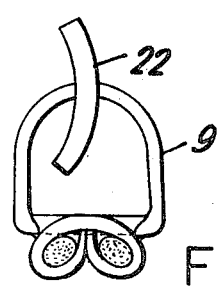
FIG. 8e is an end elevation of the blade of FIG. 8a, b in the fitting of FIG. 2.

The female fitting 13 as shown in FIG. 3 is an embodiment of the female fittings 9, 10 without a neck 4. The female fittings 14 as shown in FIG. 3a is an embodiment of the female fittings 1, 8 of FIGS. 1 and 1a.

It is preferable that the corners 15, 16 of the flanges 7, 12 be rounded and the slot 5 may be provided with a taper 17 at at least one end of the slot 5, this is to provide guidance to the blades and easy entry.

FIGS. 4a–e through 8a–e show the major shapes of pins and blades and how they fit into the fitting of the present invention.

In FIGS. 4–8 the (a) figures show an end elevation of the pin or blade, the (b) figures show a side elevation of the pin or blade, the (c) figures show the pin or blade engaged in female fitting 1, making contact and the (d) figures show an embodiment of the female fitting 1 with the pin or blade engaged making contact.

In FIGS. 4–8 the (e) figures show an end elevation of the female fitting 9 with a pin or blade engaged.

In FIGS. 4a–e, a round ground pin 18 is shown showing how its shape engaged the female fittings 1, 9.

In FIG. 5a–e, a flat blade 19 is shown engaged in the female fittings 1, 9.

In FIGS. 6a–e, a right angle ground pin 20 is shown engaged in the female fittings 1, 9.

In FIGS. 7a–e, a U ground pin 21 is shown engaged in the female fittings 1, 9.

In FIGS. 8a–e, curved blade 22 is shown engaged in the female fittings 1, 9.

It should be noted that the pins and blades 18, 19, 20, 21, 22 are exemplary since certain variations are permissible within the standards set by Underwriters' Laboratories, Inc.

Pins 18 may be solid or stamped hollow, for instance, and the blades 19, 20 may be of a folded configuration or even bowed.

The curved blade 22 may be of various sizes and may include key notches or key tabs to lock such blades 22 into a receptacle where desired or required.

Figure 9:
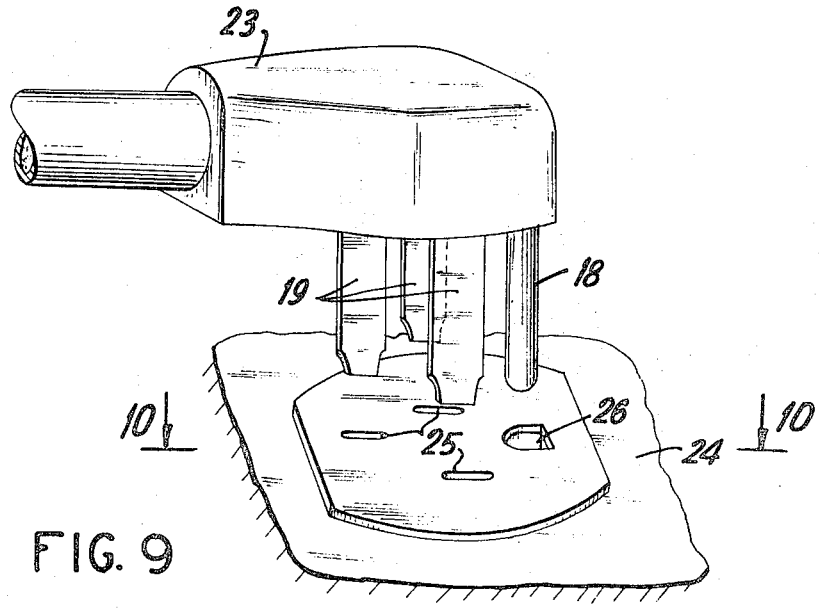
FIG. 9 is an exploded view of a plug and a receptacle with fittings of the present invention.

In FIG. 9 a typical plug 23 is shown with flat blades 19 and a round ground pin 18 exploded away from a receptacle 24. The receptacle 24 is provided with blade openings 25 and a D shaped ground pin opening 26.

Figure 10:
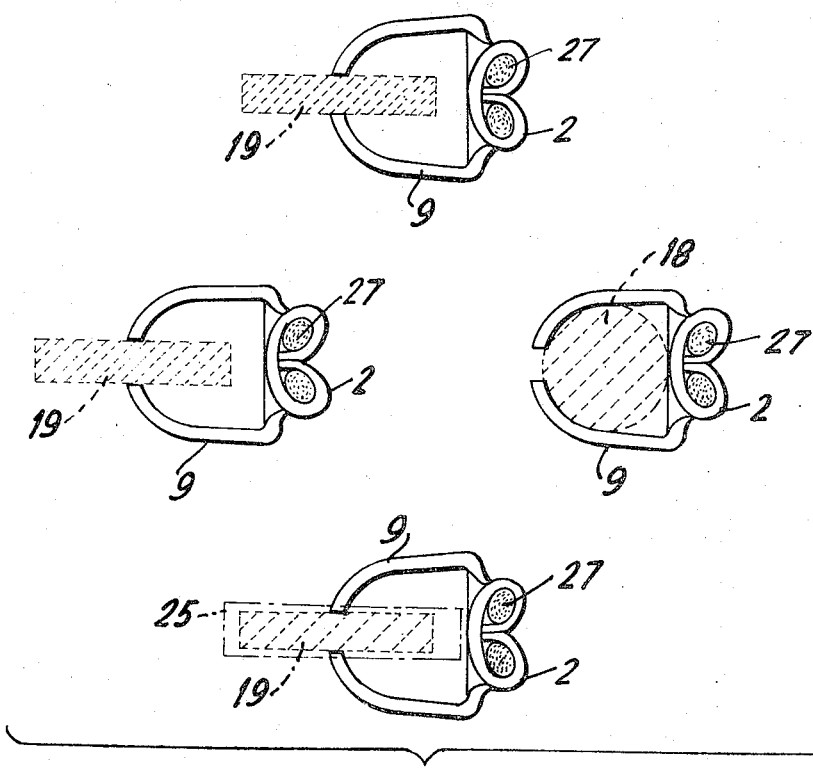
FIG. 10 is a section of FIG. 9 at lines 10—10.

In FIG. 10 the receptacle 24 is shown in section along lines 10—10 with the blades 19 engaged in the female fittings 9. The female fitting 9 having contact with a round ground pin 18 in application or a U ground pin 21 in application. As shown in FIG. 10 the female fittings 9 have their arms 2 crimped to conductor wires 27. The spatial relationship between the opening 25 and the female fitting 9 and engaged blade is also shown in FIG. 10 where an opening 25 is superimposed over the FIG. 9 and phantom blade 19.

The metal of the female fittings of the present invention has sufficient resilience to provide a sung grasp for good electrical contact for any blade that extends the slot 5 as shown in FIG. 10. The resilience of the metal also provides a snug fit for a round or U ground pin 18, 21 for both holding and providing a good electrical contact.

While the openings 25, 26 in the receptacle are of a conventional configuration, the female fittings of the present invention are placed integral of the receptacle adapted to the desired combination of blades and pins required.

In the making of receptacles 24, they may be cast with the female fittings of the present invention integral, or the fittings of the present invention may be placed by conventional means in shells already cast or molded in the desired configuration of receptacle.

By use of the multipurpose female fittings of the present invention, usually a single shape and size female fitting will suffice for all the combination of blades or pins in a plug that may be desired to go into any particular receptacle.

Problems of inventorying of female fittings of different sizes and shapes are avoided and economy of metal is provided since the blades and pins used with the female fittings of the present invention need not extend the length of the blades or pins to which they are adapted to make contact.

The terms and expressions which are employed are used as terms of description; it is recognized, though, that various modifications are possible within the scope of the invention claimed.

Having thus described certain forms of the invention in some detail, what is claimed is:

1. A multipurpose female electrical contact fitting comprising a unitary wall, said wall contoured of D shaped cross section substantially throughout the length of the said contact, said wall including a U shaped portion having a smooth constant circumference approximately equal to the radius of a standard electric contact pin, and a discontinuity in said wall defining a longitudinal slot having a span width approximately equal to the thickness of a standard electric contact blade.

2. The invention of claim 1 including a neck portion extending from said wall from a curved portion thereof.

3. The invention of claim 1 including a neck portion extending from said wall from a flat portion thereof.

4. The invention of claim 1 having at least one rounded corner between at least one wall end and one end of said longitudinal slot said rounded corner providing a greater width to said slot.

5. The invention of claim 1 wherein said longitudinal slot is slightly flared at both ends.

6. The invention of claim 1 wherein said longitudinal slot traverses said wall through a flat portion thereof.

7. The invention of claim 1 wherein said longitudinal slot traverses said wall through a curved portion thereof.

8. The invention of claim 1 including a neck portion, crimping means, said crimping means adapted to crimp an electrical conductor on the outer periphery of said fitting, and said longitudinal slots spaced away from said neck portion.

9. The invention of claim 1 including a neck portion extending from said wall.

10. The invention of claim 9 wherein said longitudinal slot traverses said wall at a portion of said wall spaced away from said neck portion.

11. The invention of claim 9 wherein said neck includes means adapted to be crimped to an electrical conductor.

12. The invention of claim 11 wherein said crimping means comprises a pair of arms.

13. The invention of claim 11 wherein said crimping means are faced away from said D portion.

14. The invention of claim 1 wherein said longitudinal slot is slightly flared at one end.

15. The invention of claim 14 having at least one rounded corner between at least one wall end and one end of said longitudinal slot on said flared portion of said slot.

References Cited

UNITED STATES PATENTS

| | | | |
|---|---|---|---|
| 1,649,305 | 11/1927 | Hartmann | 339—33 |
| 2,431,999 | 12/1947 | Engelhardt | 339—258 |
| 2,454,760 | 11/1948 | Anderson | 339—258 |
| 2,715,215 | 8/1955 | Flora | 339—191 |
| 2,743,428 | 4/1956 | Martines | 339—258 |
| 2,763,848 | 9/1956 | Tuchel | 339—258 |
| 3,128,143 | 4/1964 | Sitzler | 339—223 |
| 3,426,320 | 2/1969 | Wilm | 339—258 |

MARVIN A. CHAMPION, Primary Examiner

J. H. McGLYNN, Assistant Examiner

U.S. Cl. X.R.

339—258